US010365906B2

(12) United States Patent
Baksheev et al.

(10) Patent No.: US 10,365,906 B2
(45) Date of Patent: Jul. 30, 2019

(54) COMPILE TIME INTERFACE TO RUN-TIME LIBRARIES

(71) Applicant: INTEL CORPORATION, Santa Clara, CA (US)

(72) Inventors: Dmitry G. Baksheev, Novosibirsk (RU); Gregory M. Henry, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 15/602,551

(22) Filed: May 23, 2017

(65) Prior Publication Data

US 2018/0341470 A1    Nov. 29, 2018

(51) Int. Cl.
*G06F 8/41*    (2018.01)

(52) U.S. Cl.
CPC .......... *G06F 8/4435* (2013.01); *G06F 8/4441* (2013.01)

(58) Field of Classification Search
CPC ... G06F 8/452; G06F 8/41; G06F 8/43; G06F 8/433; G06F 8/434; G06F 8/44; G06F 8/443; G06F 8/4432–4443; G06F 8/445; G06F 8/45; G06F 8/451
See application file for complete search history.

(56) References Cited

U.S. PATENT DOCUMENTS

| | | | | |
|---|---|---|---|---|
| 7,000,227 B1 * | 2/2006 | Henry | ................. | G06F 8/443 717/146 |
| 7,318,223 B2 * | 1/2008 | Blainey | ................. | G06F 8/443 717/160 |
| 8,572,590 B2 * | 10/2013 | Lethin | ................. | G06F 8/452 717/143 |
| 2006/0048121 A1 * | 3/2006 | Blainey | ................. | G06F 8/443 717/160 |
| 2015/0331700 A1 | 11/2015 | Grover et al. | | |
| 2018/0004496 A1 * | 1/2018 | Rong | ................. | G06F 8/443 |
| 2018/0024822 A1 * | 1/2018 | Craik | ................. | G06F 8/452 717/160 |
| 2018/0157471 A1 * | 6/2018 | Venkataramani | ....... | G06F 8/445 |

(Continued)

OTHER PUBLICATIONS

Birkbeck, N, J Lévesque, JN Amaral. "A Dimension Abstraction Approach to Vectorization in Matlab." International Symposium on Code Generation and Optimization (CGO'07) pp. 1-13. (Year: 2007).*

(Continued)

*Primary Examiner* — Emerson C Puente
*Assistant Examiner* — Erika Kretzmer
(74) *Attorney, Agent, or Firm* — Grossman, Tucker, Perreault & Pfleger, PLLC

(57) ABSTRACT

Provided is a compile time interface to run-time libraries that can reduce processing overhead in loops. A compile time interface identifies, at compile time, a loop that contains a library function in response to detecting a compiler hint associated with the library function. The compile time interface generates a bypass structure and modifies the loop to include a call to a planning function for a first pass through the loop and a call to a bypass function for one or more subsequent passes though the loop. The planning function sets the bypass function equal to an optimized library if one or more selected arguments to the library function are loop-invariant.

17 Claims, 2 Drawing Sheets

(56) References Cited

U.S. PATENT DOCUMENTS

2018/0341470 A1\* 11/2018 Baksheev ............ G06F 8/4441

OTHER PUBLICATIONS

Kovács, L, A Voronkov. "Finding Loop Invariants for Programs over Arrays Using a Theorem Prover" 2009 IEEE 11th International Symposium on Symbolic and Numeric Algorithms for Scientific Computing. p. 10. (Year: 2009).\*
Rau, BR. "Iterative Modulo Scheduling: An Algorithm for Software Pipelining Loops" 1994 ACM MICRO. pp. 63-74. (Year: 1994).\*
Rong, H, J Park, L Xiang, TA Anderson, M Smelyanskiy. "Sparso: Context-driven Optimizations of Sparse Linear Algebra" Sep. 11, 2016. ACM PACT '16. pp. 247-259. (Year: 2016).\*
Touati, SA, C Eisenbeis. "Early Control of Register Pressure for Software Pipelined Loops" In Proceedings of the International Conference on Compiler Construction (CC), Warsaw, Poland, Apr. 2003. Springer-Verlag, 15 pgs. (Year: 2003).\*
Heinecke, A., et al., "LIBSXMM: A High Performance Library of Small Matrix Multiplications", 2015 International Conferenced for High Performance Computing, Networking, Storage and Analysis, Nov. 15-20, 2015, Austin, TX, http://sc15.supercomputing.org/sites/all/themes/SC15images/tech_poster/poster_files/post137s2-file3.pdf, 2 pages.
Khan, M.A., et al., "An Effective Automated Approach to Specialization of Code", ADVE, V., et al., (eds.) Languages and Compilers for Parallel Computing, LCPC 2007, Lecture Notes in Computer Science, vol. 5234, 2008, 15 pages, Springer, Berlin, Heidelberg, http://citeseerx.ist.psu.edu/viewdock/download;sessionid=BD8DFD012A6FF079C89ECFCB6AF1EB1E?doi=10.1.1.90.261&rep=rep1&type=pdf.

\* cited by examiner

COMPILE TIME INTERFACE TO RUN-TIME LIBRARIES

FIELD

The present disclosure relates to a compile time interface, in particular to, a compile time interface to run-time libraries.

BACKGROUND

Software libraries may include library functions. The library functions may be configured to help applications use hardware efficiently. An application may call a selected library function with a function call that includes specified arguments. Arguments of library functions that are associated with mathematical operations, for example, matrix multiplication, may indicate an amount of processing as well as a size of data to be processed. In other words, an argument associated with a dimension of a matrix is related to the size of the matrix and, thus, the amount of data to be processed and the amount of processing to be performed in multiplying the matrices. In operation, the library function is configured to internally process the arguments and perform the associated operations. Processing the arguments corresponds to overhead associated with the library function operations. The overhead may include, but is not limited to, checking arguments for correctness, walking a decision tree, constructing an internal processing path, generating auxiliary data (e.g., a table of coefficients), etc. This overhead is multiplied if the function call occurs in the body of the loop.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
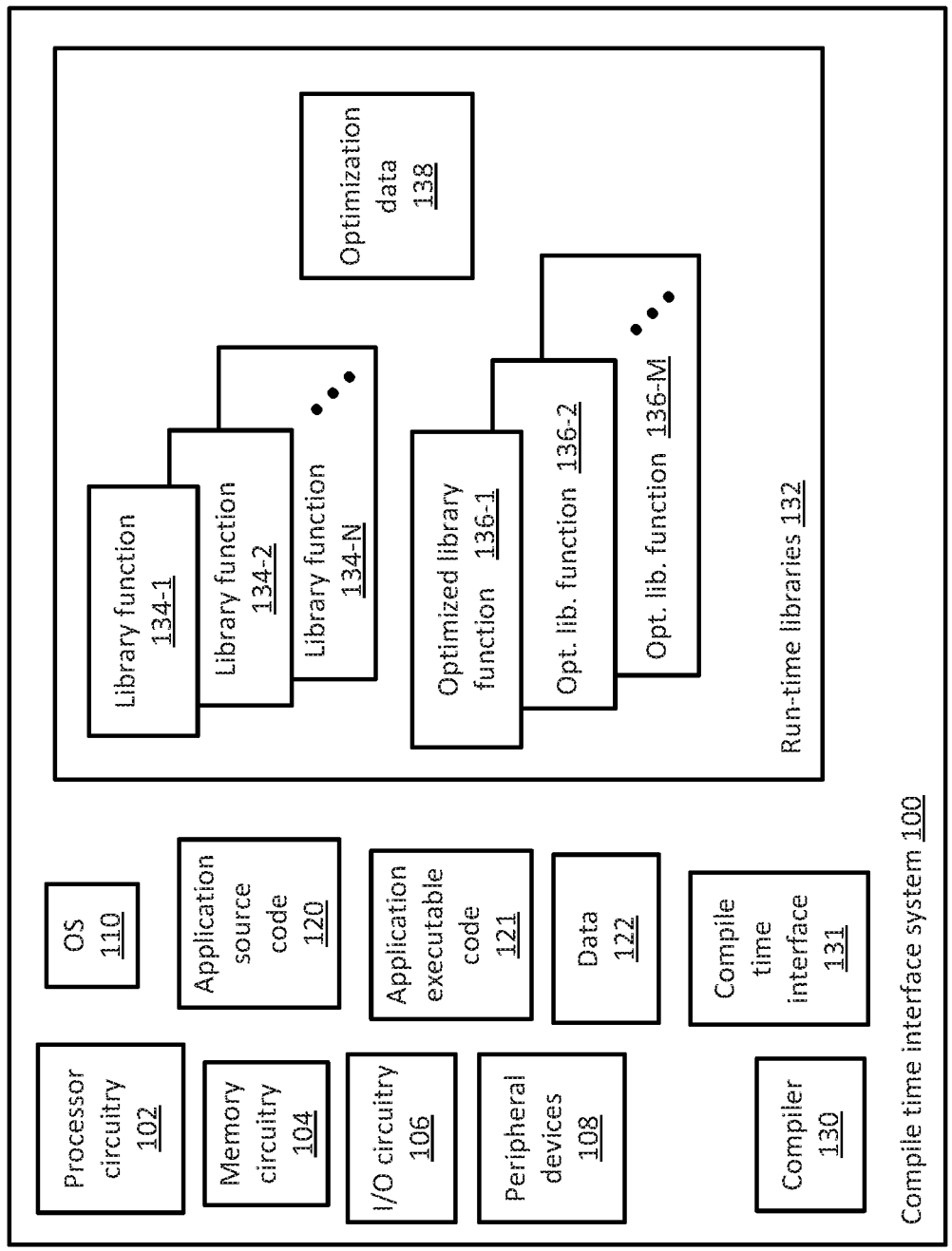
FIG. 1 illustrates a functional block diagram of a compile time interface system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

If some arguments are loop invariant, the associated overhead is similarly loop invariant. For example, moving overhead operations associated with loop invariant arguments outside the loop may provide an increase in efficiency associated with library function operations. In another example, configuring the loop to perform overhead operations during a first pass through the loop and to use the results in each pass through the loop may similarly increase efficiency.

Generally, this disclosure relates to a compile time interface to run-time libraries. A method and/or system are configured to utilize a compiler hint (e.g., attribute and/or pragma). The compiler hint is associated with a declaration of the library function whose overhead may be reduced. The declaration may be included in an application source code that calls the library function and the compiler hint may be inserted by, for example, an author of the application. The compiler hint is configured to indicate that a planner for the library function ("planning function") is available at linking time.

A compiler and/or a compile time interface may be configured to insert based, at least in part, on compile time information, an instruction sequence that includes a call to the planning function. The instruction sequence may be inserted in place of a call to an original library function. The instruction sequence is configured to convey information about loop invariant arguments to the planning function. The instruction sequence is further configured to obtain a handle to a processing path that corresponds to the values of the loop invariant arguments, e.g., a bypass function, as will be described in more detail below. The instruction sequence is configured to call the bypass function using the handle. The planning function and bypass function are configured to reduce the overhead associated with loop invariant arguments of the library function. The instruction sequence may be further configured to de-allocate the handle, to free up memory after the loop that includes the instruction sequence executes.

Thus, a compiler hint may be associated with a function call. The compiler hint is configured to notify the compiler and/or compile time interface that the associated function may be bypassable. Modification of an application source code may be limited to inclusion of the compiler hint with the function call. The method and/or system are configured to utilize library functions without requiring access to the source code of the library functions. In other words, the compiler hint may be configured to trigger locating a selected kernel from a set of predefined kernels associated with the library functions. For example, the set of predefined kernels may include one or more optimized library functions whose optimizations are related to loop invariant arguments. The method and/or system are configured to utilize compile time information to implement a planning function and/or a bypass function (e.g., to replace a library function) at compile time that may then be utilized at run time.

FIG. 1 illustrates a functional block diagram of a compile time interface system 100 consistent with several embodiments of the present disclosure. The compile time interface system 100 may include a processor circuitry 102, a memory circuitry 104, an input/output (I/O) circuitry 106, peripheral devices 108, an operating system (OS) 110, an application source code 120 and data 122. The system 100 may further include application executable code 121 that corresponds to application source code 120. For example, processor circuitry 102 may correspond to a single core or a multi-core general purpose processor, such as those provided by Intel® Corp., etc. I/O circuitry 106 may be configured to couple to one or more of peripheral devices 108 and/or may be configured to couple system 100 to one or more other devices (not shown). Peripheral devices 108 may include, but are not limited to, a sensor, an external storage device (e.g., a hard disk drive (HDD), a solid-state drive (SDD)), a user interface (e.g., a keyboard, a mouse, a display, a touch sensitive display, etc.), etc.

System 100 may further include a compiler 130, a compile time interface 131 and a group of run-time libraries 132. The compile time interface 131 may be coupled to and/or included in the compiler 130. The group of run-time libraries 132 may include a plurality of library functions 134-1, 134-2, . . . , 134-N, a plurality of optimized library functions 136-1, 136-2, . . . , 136-M and optimization data 138. For example, the run-time libraries 132, library functions 134-1, 134-2, . . . , 134-N and/or optimized library functions 136-1, 136-2, . . . , 136-M may comply and/or be compatible with one or more linear algebra libraries including, but not limited to Basic Linear Algebra Subprograms (BLAS) included in the Netlib repository, maintained by the University of Tennessee and Oak Ridge National Laboratory; Automatically Tuned Linear Algebra Software (ATLAS) included in SourceForge, an open source community, maintained by Slashdot Media; Intel® math kernel libraries (MKL) available from Intel® corporation; OpenBLAS, an open source BLAS library available from http://www.openblas.net, etc. The run-time libraries may include and/or may specify mathematical operations including, but not limited to, linear algebra operations (e.g., vector addition, scalar multiplication, dot products, linear combinations, matrix multiplication), Fast Fourier Transforms (FFT), neural networks, vector math, statistics functions, etc.

A library function, e.g., library function 134-1, may be associated with a respective subset of the optimized library functions 136-1, 136-2, . . . , 136-M. The subset may include one or more optimized library functions. For example, one or more of the optimized library functions may correspond to a respective optimized variation of the associated library function. The optimizations may be related to values of arguments associated with the corresponding library function. Optimization data 138 is configured to include conditions, e.g., conditional statements. The values of the arguments may be associated with the conditions included in optimization data 138. For example, each optimized library function may have a corresponding condition included in optimization data. If a condition is met, then an optimized library function may be used as a bypass function. If the condition is not met, then the optimized function may not be used and the bypass function may be set to the corresponding library function, as described herein. Whether or not the condition is met may be determined based, at least in part, on selected argument values.

In operation, the compiler 130 is configured to fetch application source code 120 and to generate the corresponding application executable code 121 based, at least in part, the application source code 120 and based, at least in part, on one or more of the library functions 134-1, 134-2, . . . , 134-N included in run-time libraries 132. In systems that do not include compile time interface 131, the compiler 130 may be configured to ignore the compiler hint and to thus compile the application source code 120 without bypass operations. Thus, application source code 120 that includes a compiler hint may be compiled by a system that does not include compile time interface 131, avoiding multiple versions of source code 120.

Compile time interface system 100 includes compile time interface 131. Compiler 130 and/or compile time interface 131 are configured to detect the compiler hint, at compile time, during a compiler pass through application source code 120. The compiler hint may be an attribute or a pragma, e.g., "_attribute_((bypassable))". The compiler hint is configured to be associated with a library function that may be bypassable. As used herein, "bypassable" means an optimization may exist for the library function. In one example, the optimization may be configured to reduce overhead associated with the library function. In another example, the optimization may be related to specific implementations of the library function that are themselves optimized.

Operations of compile time interface 131 may be initiated in response to detecting the compiler hint at compile time. The compile time interface 131 may be configured to implement a bypass sequence. The bypass sequence may include, among other things, a bypass structure, a planning function and a bypass function. For example, if a loop body contains a library function call marked with the compiler hint and the library function includes at least one argument that is determined to be loop invariant, compile time interface 131 is configured to generate the bypass structure. The bypass sequence is configured to reduce overhead associated with loop invariant arguments that are contained in the loop. For example, the compile time interface 131 may be configured to identify loop invariant arguments and non-loop invariant arguments. The compile time interface 131 may be configured to initialize the bypass structure with the loop invariant and non-loop invariant information. The compile time interface 131 may be further configured to replace the library function call included in the body of the loop with a call to a corresponding planning function and a bypass function, as will be described in more detail below.

The bypass sequence may include instructions configured to initialize the bypass structure prior to the loop instruction. The initialization may include information related to arguments that are loop invariant. The bypass sequence may include a planning call to the planning function that may be executed upon a first iteration of the loop. The planning call is configured to perform overhead operations and to return a handle within the bypass sequence that bypasses the overhead. The handle corresponds to the bypass function. The bypass function may be defined based on the generated bypass structure. During subsequent passes through the loop (i.e., following the first pass through the loop), the handle may be utilized to call the bypass function. The bypass function is configured to avoid the overhead that may be associated with the loop invariant arguments. For example, the bypass function may correspond to an optimized version of the corresponding library function related to the loop invariant arguments. The bypass sequence may further include an instruction to clean up, i.e., destruct, the bypass structure after the loop executes, thus, freeing up associated resources.

Thus, overhead associated with library function calls that occur in a loop may be performed once for the loop and overhead associated with the library functions may be reduced. The overhead may be reduced without significantly modifying application source code, without making library functions open and via operations of, for example, a compile time interface performed at compile time. For example, a selected kernel may be located from a set of predefined kernels associated with library functions. Compile time information may be immediately employed as opposed to being discovered at run time.

Tables 1, 2 and 3 include pseudocode for one illustrative example of operation of compiler 130 and compile time interface 131, consistent with one embodiment of the present disclosure. In this example, a library function, sgemm ( ), is called in a loop. The sgemm ("generalized matrix multiplication") library function represents a matrix multiplication of matrices that contain real numbers. The sgemm library function may comply and/or be compatible with, for example, the BLAS library. The sgemm library function includes 13 arguments. Respective indices corresponding to each argument of sgemm may be numbered from 0 through 12. In this example, at least some of the arguments of sgemm are loop invariant.

Line numbers, e.g., (x), are included at a beginning of each line in the Tables 1, 2 and 3. The line numbers are included for ease of description and have no meaning otherwise. Table 1 is configured to illustrate provision of the compiler hint. Table 2 illustrates a bypass sequence including a bypass structure and, in a corresponding loop, a call to a planning function and a call to a bypass function. The bypass sequence may be generated by, for example, compile time interface 131, in response to detection of the compiler hint illustrated in Table 1. Table 3 illustrates one example planning function associated with Table 2.

TABLE 1

| Line # | Pseudocode |
|---|---|
| (1) | void sgemm(char *transa, char *transb, int *m, int *n, int *k, |
| (2) | float *alpha, float *a, int *lda, float *b, int *ldb, |
| (3) | float *beta, float *c, int *ldc) __attribute__((bypassable)); |
| (4) | ... |
| (5) | for (int n = 0; n < N; ++n) { |
| (6) | /* code before this sgemm */ |
| (7) | sgemm( "N", "N", &M, &M, &M, &one, &a[n*lda*M], &lda, b, &ldb, |
| (8) | &zero, &c[n*ldc*M], &ldc ); |
| (9) | /* code after this sgemm */ |
| (10) | } |

Turning now to Table 1, lines 1 through 3 correspond to declaration of the library function sgemm as well as a respective data type of each argument. The declaration of lines 1 through 3 is appended at line 3 with the compiler hint "_attribute_((bypassable))". The compiler hint may be detected by compiler 130 at compile time. The existence of the compiler hint is indicated by the syntax "_attribute_ ((attribute identifier))". The compiler hint is included in the declaration of the function sgemm( ), thus, indicating to the compiler, at compile time, that the compiler hint is associated with the function sgemm( ). The compiler 130 is configured to identify compiler hints at compile time. A compiler hint may be identified based on the syntax "_attribute_((attribute identifier))". Thus, detecting a compiler hint includes identifying the string "_attribute_((attribute identifier))" associated with a function declaration. The compiler may be further configured to interpret the compiler hint based, at least in part, on the particular attribute identifier, "bypassable", in the example of Table 1.

Arguments associated with argument indices 2, 3 and 4 are declared as int *m, int *n and int *k and correspond to matrix dimensions. In other words, sgemm may be configured to multiply an m by k matrix and a k by n matrix to yield an m by n matrix. Lines 5 through 10 include a for loop with loop index, n, and N (N>1) iterations through the loop. The for loop contains a function call at lines 7 and 8 to the library function sgemm. The function call to sgemm includes both loop invariant arguments and non-loop invariant arguments. For example, arguments &a[n*lda*M] and &c[n*ldc*M] that depend on the loop index, n, are non-loop invariant. In another example, &M, &M, &M that correspond to pointers to the matrix dimensions m, n and k are loop invariant.

TABLE 2

| Line # | Pseudocode |
|---|---|
| (1) | struct bp_sgemm_s { void (*bypass)(/*same 13 args of sgemm */); |
| (2) | void (*dtor)(void*); |
| (3) | void *plan; |
| (4) | char args[13];} __b; |
| (5) | #define VOLATILE 0 /*argument is not loop-invariant*/ |
| (6) | #define PCONST 1 /*pointer to a loop-invariant value*/ |
| (7) | __b.bypass = sgemm; |
| (8) | __b.dtor = NULL; |
| (9) | __b.plan = NULL; |
| (10) | __b.args = { PCONST, PCONST, PCONST, PCONST, PCONST, |
| (11) | PCONST, VOLATILE, PCONST, PCONST, PCONST, |
| (12) | PCONST, VOLATILE, PCONST}; |
| (13) | for (int n = 0; n < N; ++n) { |
| (14) | /*code before this sgemm */ |
| (15) | if (n = = 0) { |
| (16) | __sgemm_plan ( "N", "N", &M, &M, &M, &one, &a[n*lda*M], &lda, |
| (17) | b, &ldb, &zero, &c[n*ldc*M], &ldc, &__b ); |
| (18) | } |
| (19) | __b.bypass ( "N", "N", &M, &M, &M, &one, &a[n*lda*M], &lda, |
| (20) | b, &ldb, &zero, &c[n*ldc*M], &ldc, &__b ); |
| (21) | } |
| (22) | if (__b.dtor) __b.dtor(&__b); |

Turning now to Table 2, lines 1 through 4 correspond to a declaration of a bypass structure bp_sgemm_s for the library function sgemm. The pseudocode included in Table 2 may be generated by compiler 130 and/or compile time interface 131 at compile time. The pseudo code in Table 2 may be generated in response to detecting the compiler hint associated with the library function sgemm in the for loop.

The bypass structure (lines 1 through 4) includes a destructor, "dtor" (line 2), a bypass plan, "plan" (line 3), and an array of arguments, "args" (line 4), that has a size corresponding to the number of arguments (i.e., 13) included in the library function sgemm. Table 2 further includes two directives defining two binary indicators VOLATILE and PCONST at lines 5 and 6, respectively. VOLATILE is configured to indicate that a corresponding argument is not loop invariant and PCONST is configured to indicate a pointer to a loop invariant argument. Thus, each indicator corresponds to a pointer to a loop invariant value or a non-loop invariant indicator that may be associated with the bypass function.

Lines 7 through 9 define pointer values. At line 7, _b.bypass points to the library function sgemm (the library function that is bypassable, in the illustrative example). At lines, 8 and 9, _b.dtor and _b.plan both point to NULL. In other words, _b.dtor and _b.plan may not be included in the current bypass function optimization (e.g., in the illustrative example), may not yet be defined or may not be used in this particular case. Including _b.dtor and _b.plan is configured to provide flexibility for situations (and library functions) that may or may not use either or both. For example, depending on the particular library function and available optimizations, _b.plan may be configured to point to a plan related to the library function and a selected optimization.

Lines 10 through 12 illustrate the contents of the args array. The VOLATILE indicators at array indexes 6 and 11 correspond to arguments &a[n*lda*M] and &c[n*ldc*M] of sgemm. Arguments &a[n*lda*M] and &c[n*ldc*M] depend on the loop index, n, and thus are not loop invariant. The remaining arguments in _b.args all contain pointers to constants, i.e., loop invariant arguments.

Lines 13 through 21 illustrate a for loop corresponding to the for loop of Table 1. Thus, lines 13 through 21 include a for loop with loop index, n, and N (N>1) iterations through the loop. The for loop of lines 13 through 21 of Table 2 includes calls to the planning function and the bypass function. The code of lines 15 through 18 is configured to execute one time, during a first pass through the for loop when the loop index, n, is equal to zero. Thus, the operations associated with lines 15 through 18 may correspond to overhead associated with sgemm and its planning function. The _sgemm_plan( ) function will be described in more detail below and as illustrated in Table 3. Each iteration of the for loop is configured to execute the bypass function that is defined by the _sgemm_plan( ) function, e.g., lines 19 and 20. The bypass function may be defined based on the generated bypass structure.

A destruct operation, if any, may be implemented at line 22. The destructor is configured to destroy an object when no longer needed and to thus free up memory. For example, some library functions may include a destructor that may be used for "clean up" after the function executes. Thus, if the condition of line 22 (if(_b.dtor)) is false, then _b.dtor(&_b) will not be called. For example, the condition of line 22 may be false if the associated library function does not have a destructor and no other routine changes the _b.dtor pointer from pointing to NULL to pointing to a destructor selected by the other routine.

Thus, compile time interface 131 and/or compiler 130 are configured to generate a bypass sequence for a library function that is included in a loop. For example, compile time interface 131 and/or compiler 130 are configured to generate a bypass structure. The bypass sequence may include the bypass structure and a loop including a planning function and a bypass function. The bypass sequence is configured to reduce overhead associated with the library function based, at least in part, on loop invariant arguments. The first pass through the loop is configured to perform loop invariant operations. Subsequent passes through the loop may then avoid repeating the loop invariant operations, thus increasing efficiency.

TABLE 3

| Line # | Pseudocode |
|---|---|
| (1) | void __sgemm_plan( /*13 sgemm args*/, struct bp_sgemm_s *_bp) { |
| (2) | if (_bp->args[2] = = CONST && _bp->args[3] = = CONST |
| (3) | && _bp->args[4] = = CONST) |
| (4) | { |
| (5) | _bp->bypass = locate_fixed_size_sgemm (*M, *N, *K); // overhead |
| (6) | _bp->plan = NULL; // unused in this example |
| (7) | _bp->dtor = NULL; // no generated info, no dtor needed |
| (8) | if (_bp->bypass = = NULL) _bp->bypass = sgemm; |
| (9) | } |
| (10) | } |

Turning now to Table 3, the illustrative example planning function is configured to select a specific sgemm library function (i.e., optimized library function) that may be optimized for fixed size matrices. The planning function is configured to include the bypass structure as an argument. Elements of the bypass structure, e.g., the argument array, may be utilized by the planning function for evaluating a condition associated with selecting the optimized library function. Selecting the optimized library function may correspond to overhead associated with the library function. The planning function may be further configured to provide a pointer to the optimized library function.

Line 1 contains a declaration of the _sgemm_plan( ) function, including the bypass structure illustrated in Table 2. Lines 2 through 4 include a condition related to the library function sgemm that may be bypassable. The condition(s) are configured to be evaluated at run time and, if the condition(s) are met, then an optimized library function may be executed rather than the library function. In other words, if arguments m, n and k, of sgemm that correspond to argument array indices 2, 3 and 4, are constants, then at line 5, the planning function is configured to locate an optimized library function sgemm for fixed size matrix multiplication of size corresponding to *M, *N and *K. Thus, the bypass function may be defined based on the generated bypass structure.

Lines 6 and 7 are configured to define a plan and a destructor and are not used in this example. In other words, in this illustrative example, an optimized library function is selected based on selected fixed arguments and no information is generated. Thus, a general plan (pointed to by_ bp->plan) is not used and there is nothing to destroy (so_ bp->dtor points to NULL).

In some embodiments, a plan may be configured to describe and/or implement a number of different approaches for solving a problem. In these embodiments, the planning function may be configured to implement a general plan. In these embodiments, pointer _bp->plan may be configured to point to the general plan. The general plan may include a plurality of approaches to solving the problem and a respective condition (or conditions) for selecting each approach. For example, a problem may be blocked in different ways, i.e., split into a group of relatively smaller subproblems. Respective solutions to the subproblems may vary relatively significantly across the subproblems. In other words, the library function(s) selected and/or associated optimization(s) may vary across the subproblems. For example, two subproblems may utilize a same library function but with different optimizations. In another example, two subproblems may utilize different optimized library functions. Thus, the general plan may include a plurality of pointers to a plurality of optimized library functions and a respective condition for selecting each optimized library function of the plurality of library functions.

The general plan may be configured to identify and/or describe a selected solution of a plurality of possible solutions to for each problem. For example, a library function may have a plurality of associated optimized library functions. Continuing with this example, a first solution may correspond to repeated calls to a first optimized library function and a second solution may correspond to repeated calls to a second optimized library function. The general plan may be configured to select between the first and second solutions based, at least in part, on a condition. Such selection is configured to be transparent to a user. In other words, in response to detecting the compiler hint, and based, at least in part, on available planning functions associated with a library function, the general plan may be configured to select between a plurality of possible solutions.

In another example, the general plan may include a plurality of selected invariant indicators of a loop. A subsequent pass through the loop may then be configured to call the bypass function in response to at least one of the selected invariant indicators Turning again to Table 3, at line 8, if the attempt to locate an optimized library function sgemm is not successful, then the standard library function sgemm may be selected. In other words, _bp->bypass pointer may point to locate_fixed_size_gemm( ), if the conditions are met and to sgemm otherwise. Thus, the bypass function may correspond to the optimized library function or the standard library function. In other words, line 8 is configured to allow the for loop illustrated in Table 2 and library function sgemm to operate if an optimized library function is unavailable or the condition is not met.

Turning again to Table 2, lines 16 and 17 are configured to call the sgemm planning function _sgemm_plan (illustrated in Table 3) during the first pass through the for loop that begins on line 15. The sgemm planning function includes the conditions for selecting an optimized library function or functions. If the conditions are met and the optimized library function exists, then the bypass function corresponds to the optimized library function and each iteration of the for loop (i.e., lines 19 and 20) is configured to execute the optimized library function rather than the standard sgemm library function. If the conditions are not met or the optimized library function does not exist, then the bypass function corresponds to the standard sgemm library function and each iteration of the for loop is configured to execute the standard sgemm library function.

Thus, a compiler hint may be associated with a function call configured to notify the compiler and/or compile time interface that the associated function may be bypassable. Modification of an application source code may be limited to inclusion of the compiler hint with the function call. The method and/or system are configured to utilize library functions without requiring access to the source code of the library functions. In other words, the compiler hint may be configured to trigger locating a selected kernel from a set of predefined kernels associated with the library functions. For example, the set of predefined kernels may include one or more optimized library functions whose optimizations are related to loop invariant arguments. The method and/or system are configured to utilize compile time information to implement a planning function and/or a bypass function (e.g., to replace a library function with an optimized library function) at compile time that may then be utilized at run time.

Figure 2:
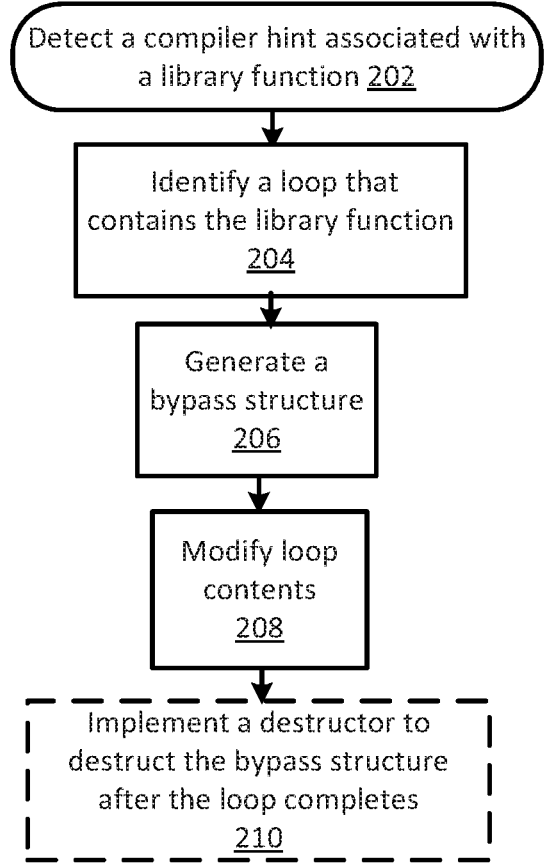
FIG. 2 is a flowchart of compile time operations according to various embodiments of the present disclosure.

FIG. 2 is a flowchart 200 of compile time operations according to various embodiments of the present disclosure. In particular, the flowchart 200 illustrates generating a bypass sequence including generating a bypass structure and modifying a loop to include calls to a planning function and a bypass function. The operations may be performed, for example, by compiler 130 and/or compile time interface 131 of FIG. 1.

Operations of this embodiment may begin with detecting a compiler hint associated with a library function at operation 202. A loop that contains the library function may be identified at operation 204. A bypass structure may be generated at operation 206. Loop contents may be modified at operation 208. For example, the loop contents may be modified to include a call to a planning function during a first pass through the loop and a call to a bypass function for one or more subsequent passes through the loop. In some embodiments, flowchart 200 may include implementing a destructor to destruct the bypass structure after the loop completes at operation 210.

While the flowchart of FIG. 2 illustrates operations according various embodiments, it is to be understood that not all of the operations depicted in FIG. 2 are necessary for other embodiments. In addition, it is fully contemplated herein that in other embodiments of the present disclosure, the operations depicted in FIG. 2 and/or other operations described herein may be combined in a manner not specifically shown in any of the drawings, and such embodiments may include less or more operations than are illustrated in FIG. 2 Thus, claims directed to features and/or operations that are not exactly shown in one drawing are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor 102 executing code and/or instructions sets (e.g., software, firmware, etc.) corresponding to the functionality described herein, thus transforming a general-purpose processor into a specific-purpose processing environment to perform one or more of the operations described herein.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., compile time interface system 100. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement a protocol stack. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

Memory 104 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, means for performing acts of the method, a device, or of an apparatus or system related to a compile time interface, as discussed below.

Example 1

According to this example, there is provided an apparatus. The apparatus includes a processor circuitry; a memory circuitry; and a compile time interface. The compile time interface is to identify, at compile time, a loop that contains a library function in response to detecting a compiler hint associated with the library function. The compile time interface is further to generate a bypass structure. The compile time interface is further to modify the loop to include a call to a planning function for a first pass through the loop and a call to a bypass function for one or more subsequent passes though the loop, the bypass function defined based on the generated bypass structure.

Example 2

This example includes the elements of example 1, wherein the compile time interface is further to implement a destructor to destruct the bypass structure after the loop completes.

Example 3

This example includes the elements of example 1, wherein the compile time interface is to set the bypass function equal to an optimized library function if a condition included in the planning function is met or to the library function if the condition is not met.

Example 4

This example includes the elements of example 3, wherein the optimized library function is selected from a plurality of optimized library functions.

Example 5

This example includes the elements according to any one of examples 1 to 3, wherein the bypass structure includes an argument array including a plurality of indicators, each indicator corresponding to a pointer to a loop invariant value or a non-loop invariant indicator associated with the bypass function.

Example 6

This example includes the elements according to any one of examples 1 to 3, wherein the bypass structure includes a pointer to a general plan.

Example 7

This example includes the elements according to any one of examples 1 to 3, wherein the bypass structure includes a pointer to a general plan, the general plan including a plurality of selected invariant indicators of the loop, wherein a subsequent pass through the loop calls the bypass function in response to at least one of the selected invariant indicators.

Example 8

This example includes the elements according to any one of examples 1 to 3, wherein the library function complies and/or is compatible with a linear algebra library.

Example 9

This example includes the elements of example 8, wherein the linear algebra library is selected from the group including Basic Linear Algebra Subprograms (BLAS), Automatically Tuned Linear Algebra Software (ATLAS), Intel® math kernel libraries (MKL) and OpenBLAS.

Example 10

According to this example, there is provided a method. The method includes identifying, by a compile time interface, at compile time, a loop that contains a library function in response to detecting a compiler hint associated with the library function; generating, by the compile time interface, a bypass structure; and modifying, by the compile time interface, the loop to include a call to a planning function for a first pass through the loop and a call to a bypass function for one or more subsequent passes though the loop, the bypass function defined based on the generated bypass structure.

Example 11

This example includes the elements of example 10, further including implementing, by the compile time interface, a destructor to destruct the bypass structure after the loop completes.

Example 12

This example includes the elements of example 10, further including setting, by the compile time interface, the bypass function equal to an optimized library function if a condition included in the planning function is met or to the library function if the condition is not met.

Example 13

This example includes the elements of example 12, wherein the optimized library function is selected from a plurality of optimized library functions.

Example 14

This example includes the elements of example 10, wherein the bypass structure includes an argument array including a plurality of indicators, each indicator corresponding to a pointer to a loop invariant value or a non-loop invariant indicator associated with the bypass function.

Example 15

This example includes the elements of example 10, wherein the bypass structure includes a pointer to a general plan.

Example 16

This example includes the elements of example 10, wherein the bypass structure includes a pointer to a general plan, the general plan including a plurality of selected invariant indicators of the loop, wherein a subsequent pass through the loop calls the bypass function in response to at least one of the selected invariant indicators.

Example 17

This example includes the elements of example 10, wherein the library function complies and/or is compatible with a linear algebra library.

Example 18

This example includes the elements of example 17, wherein the linear algebra library is selected from the group including Basic Linear Algebra Subprograms (BLAS), Automatically Tuned Linear Algebra Software (ATLAS), Intel® math kernel libraries (MKL) and OpenBLAS.

Example 19

According to this example, there is provided a system. The system includes a processor circuitry; a memory circuitry; a compiler; and a compile time interface. The compile time interface is to identify, at compile time, a loop that contains a library function in response to detecting a compiler hint associated with the library function. The compile time interface is further to generate a bypass structure, and to modify the loop to include a call to a planning function for a first pass through the loop and a call to a bypass function for one or more subsequent passes though the loop, the bypass function defined based on the generated bypass structure.

Example 20

This example includes the elements of example 19, further including a runtime library including a plurality of library functions.

Example 21

This example includes the elements of example 19, wherein the compile time interface is further to implement a destructor to destruct the bypass structure after the loop completes.

Example 22

This example includes the elements of example 19, wherein the compile time interface is to set the bypass function equal to an optimized library function if a condition included in the planning function is met or to the library function if the condition is not met.

Example 23

This example includes the elements of example 22, wherein the optimized library function is selected from a plurality of optimized library functions.

Example 24

This example includes the elements according to any one of examples 19 to 22, wherein the bypass structure includes an argument array including a plurality of indicators, each indicator corresponding to a pointer to a loop invariant value or a non-loop invariant indicator associated with the bypass function.

Example 25

This example includes the elements according to any one of examples 19 to 22, wherein the bypass structure includes a pointer to a general plan.

Example 26

This example includes the elements according to any one of examples 19 to 22, wherein the bypass structure includes a pointer to a general plan, the general plan including a plurality of selected invariant indicators of the loop, wherein a subsequent pass through the loop calls the bypass function in response to at least one of the selected invariant indicators.

Example 27

This example includes the elements according to any one of examples 19 to 22, wherein the library function complies and/or is compatible with a linear algebra library.

Example 28

This example includes the elements of example 27, wherein the linear algebra library is selected from the group including Basic Linear Algebra Subprograms (BLAS), Automatically Tuned Linear Algebra Software (ATLAS), Intel® math kernel libraries (MKL) and OpenBLAS.

Example 29

According to this example, there is provided a computer readable storage device. The device has stored thereon instructions that when executed by one or more processors result in the following operations including: identifying, at compile time, a loop that contains a library function in response to detecting a compiler hint associated with the library function; generating a bypass structure; and modifying, the loop to include a call to a planning function for a first pass through the loop and a call to a bypass function for one or more subsequent passes though the loop, the bypass function defined based on the generated bypass structure.

Example 30

This example includes the elements of example 29, wherein the instructions that when executed by one or more processors results in the following additional operations including implementing a destructor to destruct the bypass structure after the loop completes.

Example 31

This example includes the elements of example 29, wherein the instructions that when executed by one or more processors results in the following additional operations including setting the bypass function equal to an optimized library function if a condition included in the planning function is met or to the library function if the condition is not met.

Example 32

This example includes the elements of example 31, wherein the optimized library function is selected from a plurality of optimized library functions.

Example 33

This example includes the elements according to any one of examples 29 to 31, wherein the bypass structure includes an argument array including a plurality of indicators, each indicator corresponding to a pointer to a loop invariant value or a non-loop invariant indicator associated with the bypass function.

Example 34

This example includes the elements according to any one of examples 29 to 31, wherein the bypass structure includes a pointer to a general plan.

Example 35

This example includes the elements according to any one of examples 29 to 31, wherein the bypass structure includes a pointer to a general plan, the general plan including a plurality of selected invariant indicators of the loop, wherein a subsequent pass through the loop calls the bypass function in response to at least one of the selected invariant indicators.

Example 36

This example includes the elements according to any one of examples 29 to 31, wherein the library function complies and/or is compatible with a linear algebra library.

Example 37

This example includes the elements of example 36, wherein the linear algebra library is selected from the group including Basic Linear Algebra Subprograms (BLAS), Automatically Tuned Linear Algebra Software (ATLAS), Intel® math kernel libraries (MKL) and OpenBLAS.

Example 38

According to this example, there is provided a device. The device includes means for identifying, by a compile time interface, at compile time, a loop that contains a library function in response to detecting a compiler hint associated with the library function; means for generating, by the compile time interface, a bypass structure; and means for modifying, by the compile time interface, the loop to include a call to a planning function for a first pass through the loop and a call to a bypass function for one or more subsequent passes though the loop, the bypass function defined based on the generated bypass structure.

Example 39

This example includes the elements of example 38, further including means for implementing, by the compile time interface, a destructor to destruct the bypass structure after the loop completes.

Example 40

This example includes the elements of example 38, further including means for setting, by the compile time interface, the bypass function equal to an optimized library function if a condition included in the planning function is met or to the library function if the condition is not met.

Example 41

This example includes the elements of example 40, wherein the optimized library function is selected from a plurality of optimized library functions.

Example 42

This example includes the elements according to any one of examples 38 to 40, wherein the bypass structure includes an argument array including a plurality of indicators, each indicator corresponding to a pointer to a loop invariant value or a non-loop invariant indicator associated with the bypass function.

Example 43

This example includes the elements according to any one of examples 38 to 40, wherein the bypass structure includes a pointer to a general plan.

Example 44

This example includes the elements according to any one of examples 38 to 40, wherein the bypass structure includes a pointer to a general plan, the general plan including a plurality of selected invariant indicators of the loop, wherein a subsequent pass through the loop calls the bypass function in response to at least one of the selected invariant indicators.

Example 45

This example includes the elements according to any one of examples 38 to 40, wherein the library function complies and/or is compatible with a linear algebra library.

Example 46

This example includes the elements of example 45, wherein the linear algebra library is selected from the group including Basic Linear Algebra Subprograms (BLAS), Automatically Tuned Linear Algebra Software (ATLAS), Intel® math kernel libraries (MKL) and OpenBLAS.

Example 47

According to this example, there is provided a system. The system includes at least one device arranged to perform the method of any one of examples 10 to 18.

Example 48

According to this example, there is provided a device. The device includes means to perform the method of any one of examples 10 to 18.

Example 49

According to this example, there is provided a computer readable storage device. The device has stored thereon instructions that when executed by one or more processors result in the following operations including the method according to any one of examples 10 through 18.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
   processor circuitry;
   memory circuitry; and
   a compile time interface to:
   identify, at compile time, a loop that contains a library function in response to detecting a compiler hint associated with the library function;
   generate a bypass structure that includes a pointer to a bypass function and an argument array comprising an array of indicators, wherein the array of indicators includes an indicator for each argument of the library function, and wherein each indicator is a binary value indicating whether the corresponding argument is loop-invariant or is not loop-invariant; and
   modify the loop to include a call to a planning function for a first pass through the loop and a call to the bypass function for the first pass and one or more subsequent passes though the loop, wherein the planning function includes code to set the bypass function equal to an optimized library function if a condition included in the planning function is met or to the library function if the condition is not met, wherein the condition is met when one or more indicators in the array of indicators indicate that the corresponding argument of the library function in the pass through the loop is loop-invariant.

2. The apparatus of claim 1, wherein the compile time interface is further to implement a destructor to destruct the bypass structure after the loop completes.

3. The apparatus of claim 1, wherein the optimized library function is selected from a plurality of optimized library functions.

4. The apparatus of claim 1, wherein each of at least one of the subsequent one or more passes through the loop calls the bypass function in response to at least one selected invariant indicator.

5. The apparatus of claim 1, wherein the library function complies and/or is compatible with a linear algebra library.

6. A system comprising:
processor circuitry;
memory circuitry;
a compiler; and
a compile time interface to:
identify, at compile time, a loop that contains a library function in response to detecting a compiler hint associated with the library function;
generate a bypass structure that includes a pointer to a bypass function and an argument array comprising an array of indicators, wherein the array of indicators includes an indicator for each argument of the library function, and wherein each indicator is a binary value indicating whether the corresponding argument is loop-invariant or is not loop-invariant; and
modify the loop to include a call to a planning function for a first pass through the loop and a call to the bypass function for the first pass and one or more subsequent passes though the loop, wherein the planning function includes code to set the bypass function equal to an optimized library function if a condition included in the planning function is met or to the library function if the condition is not met, wherein the condition is met when one or more indicators in the array of indicators indicate that the corresponding argument of the library function in the pass through the loop is loop-invariant.

7. The system of claim 6, further comprising a runtime library comprising a plurality of library functions.

8. The system of claim 6, wherein the compile time interface is further to implement a destructor to destruct the bypass structure after the loop completes.

9. The system of claim 6, wherein the optimized library function is selected from a plurality of optimized library functions.

10. The system of claim 6, wherein each of at least one of the subsequent one or more passes through the loop calls the bypass function in response to at least one selected invariant indicator.

11. The system of claim 6, wherein the library function complies and/or is compatible with a linear algebra library.

12. The system of claim 11, wherein the linear algebra library is selected from the group comprising Basic Linear Algebra Subprograms (BLAS), Automatically Tuned Linear Algebra Software (ATLAS), Intel® math kernel libraries (MKL) and OpenBLAS.

13. A non-transitory computer-readable storage device having stored thereon instructions that when executed by one or more processors result in the following operations comprising:
identifying, at compile time, a loop that contains a library function in response to detecting a compiler hint associated with the library function;
generating a bypass structure including a pointer to a bypass function and an argument array comprising a plurality of indicators, wherein the array of indicators includes an indicator for each argument of the library function, and wherein each indicator is a binary value indicating whether the corresponding argument is loop-invariant or is not loop-invariant; and
modifying the loop to include a call to a planning function for a first pass through the loop and a call to the bypass function for the first pass and one or more subsequent passes though the loop, the planning function including code to set the bypass function equal to an optimized library function if a condition included in the planning function is met or to the library function if the condition is not met, the condition being met when one or more indicators in the array of indicators indicate that the corresponding argument of the library function in the pass through the loop is loop-invariant.

14. The non-transitory computer-readable storage device of claim 13 wherein the instructions, when executed by the one or more processors, result in additional operations comprising implementing a destructor to destruct the bypass structure after the loop completes.

15. The non-transitory computer-readable storage device of claim 13, wherein the optimized library function is selected from a plurality of optimized library functions.

16. The non-transitory computer-readable storage device of claim 13, wherein each of at least one of the subsequent one or more passes through the loop calls the bypass function in response to at least one selected invariant indicator.

17. The non-transitory computer-readable storage device of claim 13, wherein the library function complies and/or is compatible with a linear algebra library.

* * * * *